Jan. 10, 1950 E. S. PETERSON 2,494,486

RADIO TUNING CONTROL

Filed May 9, 1946 2 Sheets-Sheet 1

INVENTOR.
EDWARD S. PETERSON

BY Chas. K. Candy

ATTORNEY

Jan. 10, 1950 E. S. PETERSON 2,494,486

RADIO TUNING CONTROL

Filed May 9, 1946 2 Sheets-Sheet 2

INVENTOR.
EDWARD S. PETERSON

BY Chas. W. Candy

ATTORNEY

Patented Jan. 10, 1950 2,494,486

UNITED STATES PATENT OFFICE 2,494,486

RADIO TUNING CONTROL

Edward S. Peterson, Elmwood Park, Ill., assignor to Automatic Electric Laboratories, Inc., Chicago, Ill., a corporation of Delaware Application May 9, 1946, Serial No. 668,352

12 Claims. (Cl. 318—265)

This invention relates in general to facilities for tuning radio apparatus automatically, and is more particularly concerned with control mechanism for rotating a given shaft to predetermined angular positions.

Push button arrangements for selectivity positioning the tuning shaft of a radio set are well known. It is the object of the present invention to improve upon the known arrangements by the provision of mechanism which will effect tuning automatically and selectively with greater precision than heretofore.

Another object of the invention is to provide automatic means for thus setting or indexing a shaft to preselected positions, which setting means may be controlled from a remote point.

It is a further object of the invention to provide facilities for rotating a radio tuning shaft at different speeds at different times; and more specifically, to drive the shaft at high speed until it nears the desired position and then automatically to reduce its speed while a final accurate adjustment is secured.

Another object of the invention is to provide mechanism for rotating a shaft through an angle exceeding one complete revolution, said mechanism having facilities for selectively indexing said shaft in any position within that angle, whereby different index positions may be more than 360° apart.

A feature of the invention is the provision of stops on a radio tuning shaft, together with selectively controlled means for introducing blocking members into the path of said stops after different numbers of revolutions in different cases.

Other objects and features of the invention will be made clear in the ensuing description of one embodiment thereof, reference being made to the accompanying drawings, wherein Fig. 1 shows in diagrammatic form the complete assembly of the automatic tuning mechanism according to the invention and the electrical control circuits used in conjunction therewith; and Figs. 2–6, inclusive, show the positions occupied by certain of the control elements at various stages in the operation of the tuning mechanism. More specifically, Fig. 2 shows these elements in their normal or noncontrolling position;

Figure 1:
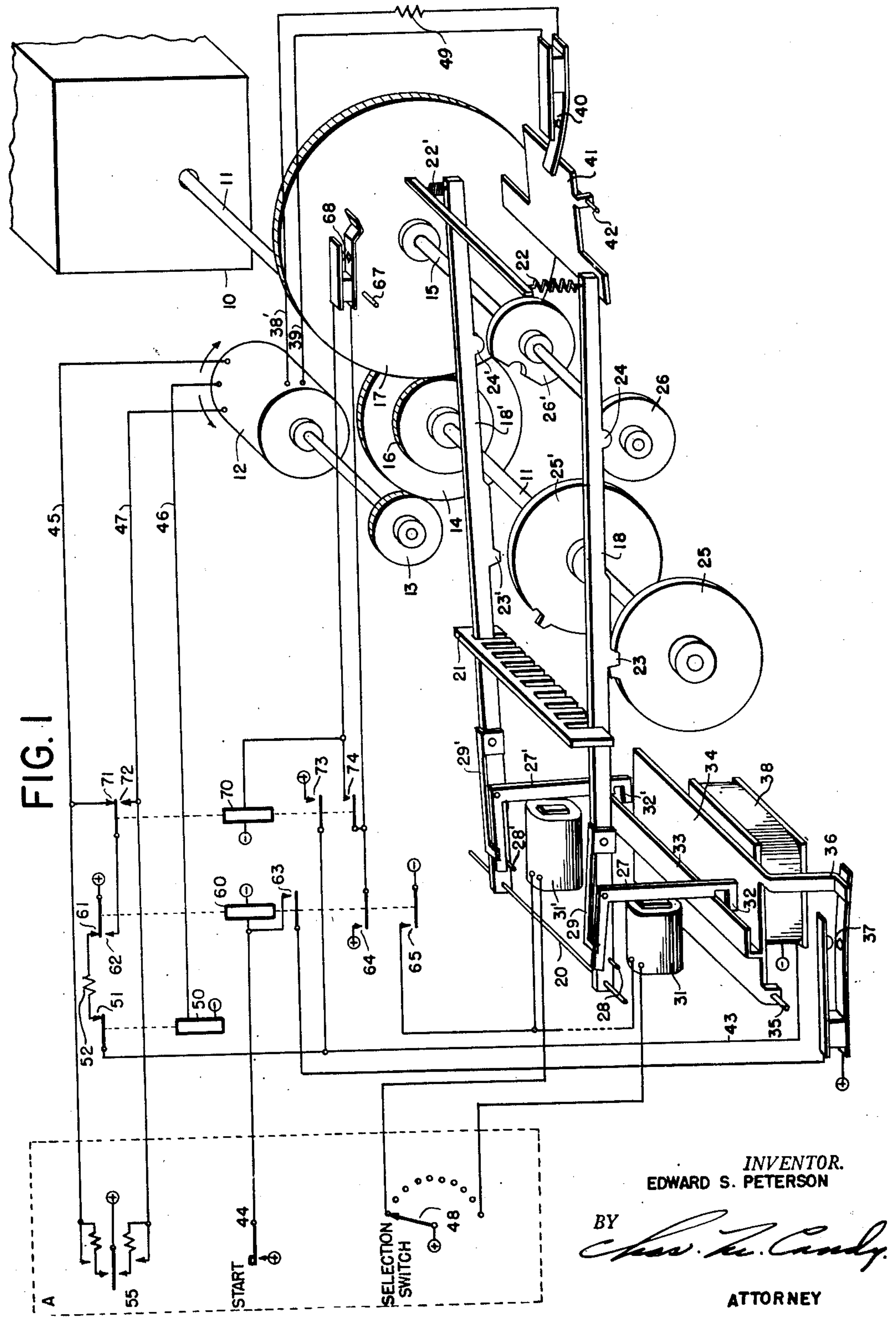

Referring to Fig. 1, the radio set indicated at 10 has a tuning device such as a stepless variable inductance (not shown) which is controlled by tuning shaft 11, and it will be assumed for purposes of illustration that seven consecutive revolutions of the shaft are required to cover the full range of the tuning device, i. e., to change it from its minimum value to its maximum value. It naturally is important to be able to set the tuning device to such points intermediate the extreme limits of its range as correspond to various broadcast frequencies, and this is accomplished according to the invention by remote control arrangements for automatically halting the tuning shaft at any desired one of a number of predetermined angular positions within its operating range of seven revolutions.

The shaft 11 is driven by a reversible, series wound, direct current motor 12 through the medium of a gear 13 on the motor shaft and, meshing therewith, a pinion 14 which is rigidly affixed to the tuning shaft. Shaft 11 upon rotation by the motor drives a parallel auxiliary shaft 15 through a gear 16 and a pinion 17 meshing therewith, the ratio between the two conveniently being such that the shaft 11 makes eight revolutions for one revolution of shaft 15.

Arranged transversely of the two shafts are a series of elongated substantially horizonal selecting bars. Only the first and last of these bars (18 and 18′) are shown, the remainder being omitted for the sake of clarity. Each of the bars is supported at its left hand end by a shaft 20 about which it is free to rotate. A comb-like spacing and stop member 21 maintains the bars in spaced-apart relationship while springs such as 22 and 22′ tend to lift the free end of the individual bars as high as the member 21 will permit.

Bar 18 has a pair of downwardly extending projections 23 and 24 which cooperate respectively with a pair of cams 25 and 26, the first-mentioned cam being rigidly secured to the tuning shaft 11 while the second is rigidly secured to the auxiliary shaft 15. In the position of the tuning shaft illustrated (which is one of the positions in which it is desired to be able to halt that shaft) it will be noted that the projections 23 and 24 on the bar register with corresponding notches or depressions in cams 25 and 26. Each of the remaining horizontal bars have similar projections cooperating with similar cams; and for every other position in which it is desired to be able to halt the tuning shaft a different set of cams corresponding to 25 and 26 will be preset on their respective shafts so that the depressions in those cams register with the projections on the associated horizontal bar when the shaft 11 occupies the desired tuning position.

Pivotally supported on the horizontal bar 18 near its left hand end is a generally L-shaped magnetic armature 27, which hereinafter will be referred to as a selecting armature. The horizontal leg of this armature normally abuts against a stop pin 28 under the influence of a small spring 29 affixed to the bar. An electro-magnet 31 is adapted to rotate the armature in a clockwise direction against the tension of this spring thereby to cause the projection 32 on the lower end of the armature to latch underneath a latching strip 33 which is integral with, or rigidly affixed to, the magnetic armature 34. Each of the horizontal selecting bars corresponding to 18 has a similar L-shaped selecting armature and an individual electro-magnet like 31 for operating same.

Armature 34 is rotatably mounted upon a pivot pin 35 which extends along the underside of the armature near its left hand edge. Projecting laterally from the opposite edge of the armature is an arm 36 which engages one spring of the contact set 37. This spring is so tensioned that it tends to rotate the armature in a counter-clockwise direction from the position illustrated and tends also to close contact 37. An electro-magnet 38, hereinafter referred to as the operating magnet, is associated with the armature and is effective when energized to draw the armature down against the tension of the spring so that it occupies the position illustrated in Figs. 1 and 2. Referring to the latter figure, it will be noted that when the armature 34 is drawn down the edge of latching strip 33 stands in the way of the projections on the lower end of each selecting armature which occupies its normal position, so that the latter selecting armatures may not be attracted by their respective selecting magnets.

Attention is directed to contact set 40 and to the T-shaped rocker member for operating same. Pivotally supported upon a pin 42, this member is urged by one spring of the contact set to occupy the position illustrated in Figs. 3 and 4, in which position it will be noted that the associated contact set is open. Whenever the free end of any one of the horizontal selecting bars is depressed a certain amount it engages the rocker member and closes the contact as will be explained more in detail presently.

The operation of the tuning system now will be described, it being assumed that at the beginning the various parts of the mechanism occupy the positions illustrated in Figs. 1 and 2 as a result of a previous selecting operation. Referring to Fig. 1, it will be noted that the operating magnet 38 is energized due to a circuit extending from its winding over conductor 43, contact 51, resistor 52 and contact 61 to positive battery. Accordingly armature 34 is held down in its operated position so that it maintains contact 37 open. Moreover since the projection 32 on one of the selecting armatures (27) is caught under the latching strip 33 this holds down the associated selecting bar 18 against the tension of spring 22 and consequently holds contact 40 closed. (Although selecting magnet 31 is not energized at this time, it will be understood that armature 27 is maintained in the position shown against the tension of spring 29 due to the friction between projection 32 and the latching strip.) All of horizontal selecting bars except 18 occupy retracted positions corresponding to that in which bar 18′ is shown, and except for the above-mentioned circuit for energizing the winding of magnet 38 no other completed circuits exist at this time.

At the control station A, which may be remote from the tuning mechanism, is a start push button 44, a manually settable selection switch 48 and a two way key 55. Let it be assumed that with the selection switch positioned as shown the start push button is depressed for a brief interval. This completes an obvious circuit for relay 60 which thereupon opens contact 61 and closes contacts 62, 63, 64 and 65. The opening of contact 61 interrupts the before-mentioned circuit for magnet 38 whereupon armature 34, selection bar 18, selecting armature 27 and the rocker member 41 all restore to normal. Contact 37 closes upon the return of armature 34 to normal and completes the following locking circuit for relay 60: positive battery, contacts 37 and 63, winding relay 60 and negative battery. This locking circuit will maintain relay 60 operated when the start push button 44 now is permitted to restore.

At contact 62 the following circuit is established: positive battery, contacts 62 and 71, conductor 45, motor 12, conductor 46, winding of relay 50 and negative battery. Accordingly motor 12 starts rotating in a clockwise direction while relay 50, operating in series therewith, causes contact 51 to open another point in the circuit for magnet 38. The closing of contact 65 connects negative battery to one side of all selecting magnets, whereupon one of said magnets will energize in accordance with the position of selection switch 48; more particularly since switch 48 is standing on the first contact in its associated bank, positive battery is connected to the other terminal of selecting magnet 31′ causing this magnet to operate its armature 27′. As motor 12 drives shaft 11 in a counter-clockwise direction and shaft 15 in a clockwise direction, the selecting armature 27′ and the selecting bar 18′ thus occupy the positions illustrated in Fig. 3, from which it will be seen that projection 24′ remains spaced slightly away from the periphery of cam 26′. All other horizontal selecting bars are similarly positioned, and therefore none interfere with the rotation of the two shafts.

This condition prevails until the pin 67 carried by the pinion 17 engages one of the springs of contact 68 and closes said contact. When this occurs the following circuit is established: positive battery, contacts 64 and 68, winding of relay 70 and negative battery. Relay 70 operates and locks up at contact 74 to positive battery on contact 64. The above-traced circuit for motor 12 is opened at contact 71 while contact 72 establishes the following circuit for operating the motor in the reverse direction: positive battery, contacts 62 and 72, conductor 47, motor 12, conductor 46, winding of relay 50 and negative battery. Shaft 11 therefore begins to rotate in a clockwise direction while shaft 15 turns in a counter-clockwise direction. At the same time contact 73 completes an obvious circuit over conductor 43 for re-energizing the operating magnet 38, and accordingly armature 34 cooperates with the operated selecting armature 27' to draw down the bar 18' until projection 24' rests upon cam 26', as to clear the highest part of cam 25'; moreover it maintains the free end of bar 18 high enough to prevent same from closing contact 40 and it also prevents armature 34 from being drawn down by the operating magnet far enough to open contact 37.

No further change occurs until cam 26' permits the bar 18' to be drawn farther by operating magnet 38. In the present case, this takes place after approximately six revolutions of shaft 11, when the projection 24' begins to bear upon the flat portion of cam 26'. As the flat portion of the cam approaches the horizontal, magnet 38 draws bar 18' down until the projection 23' thereon rests upon the arcuate portion of cam 25' as shown in Fig. 5. Armature 34 obviously moves down slightly at the same time but its movement is not enough to open contact 37; the downward movement of bar 18' is sufficient, however, to tilt the rocker member 41 and cause contact 40 to close. Conductors 38' and 39 are connected to opposite ends of the armature winding of motor 12 so that the closing of contact 40 has the effect of connecting resistor 49 in bridge to that winding. This reduces the speed of motor 12 very materially while the final accurate adjustment of shaft 11 is made.

The mechanism now is under control of cam 25' which is turning rather slowly in a clockwise direction. When the notch in the periphery of this cam comes into register with the projection 23', bar 18' moves down slightly under the influence of electro-magnet 38 thereby locking shaft 11. The downward movement of armature 34 which takes place at the same time causes contact 37 to open the locking circuit for relay 60, and the consequent restoration of this relay to normal opens the motor circuit at contact 62 so that there is no tendency to move the tuning shaft 11 from its locked position.

The opening of the motor circuit also releases relay 50 which is included in said circuit in series with the motor. Contact 65 opens a circuit for selecting magnet 31' but it will be understood that the frictional engagement between the latching strip 33 and the projection 32' maintains armature 27' operated. At contact 64 the locking circuit for relay 70 is interrupted, and relay 70 upon restoring to normal opens the initial operating circuit for magnet 38 at contact 73; this has no effect, however, due to the locking circuit for magnet 38 which now exists over contact 51, resistor 52 and contact 61.

Figures 2, 3, 4, 5, 6:
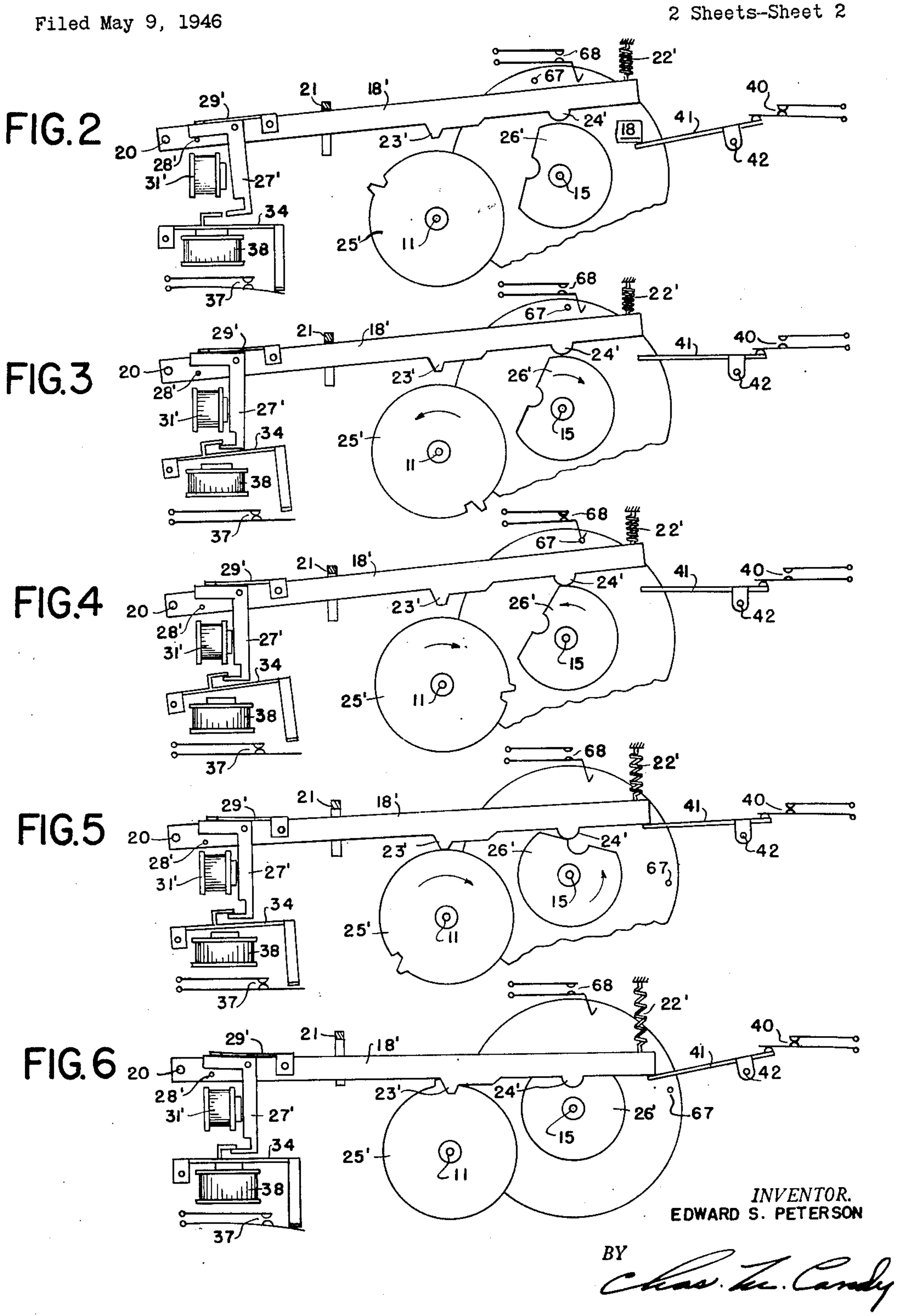
Fig. 3 shows the position of these elements when, at the beginning of an indexing operation, the tuning shaft is rotated in one direction.
Fig. 4 shows the position of these elements when the tuning shaft subsequently is started to rotate in the opposite direction.
Fig. 5 shows the position of these elements near the end of an indexing operation.
Fig 6 shows said elements in the position occupied by them when the tuning shaft is finally halted.

The various parts of the mechanism are now positioned as shown in Fig. 6, and the circuits for the apparatus are in the same condition as before start button 44 was operated.

It will be understood that by re-setting the selection switch 48 to some other position and then momentarily reoperating the start button the mechanism may be caused to function again in the same general fashion as described above excepting that tuning shaft 11 will be halted in a different position, the position in which it halts in each case being determined by the selecting magnet operated and the angular position of the associated cams on shafts 11 and 15. The selection switch is illustrated as having 10 positions which correspond respectively to 10 predetermined broadcast frequencies (i. e., 10 predetermined angular positions of the tuning shaft) but it will be appreciated that any number of selections may be provided for on the basis of one pair of cams per selection, each pair of cams having its associated horizontal bar and individual control magnet therefor.

Switch key 55 is provided at the control station for the purpose of setting shaft 11 to positions other than obtainable by means of the automatic tuning arrangement described above. In order to cause the motor to turn the tuning shaft in a clockwise direction the switch key 55 is moved downwardly, and in order to cause it to turn the shaft counter-clockwise the switch is moved upwardly. The motor is halted simply by restoring the switch key to normal. It will be observed that if the key is moved only part way in either direction a resistance is included in a motor circuit so that the motor operates slowly to facilitate accurate positioning of the tuning shaft; this resistance is short-circuited by moving the key farther in the chosen direction thereby causing the motor to operate at a higher rate of speed.

When the switch key 55 is thrown either way to start motor 12, relay 50 operates in series with the motor as previously mentioned. Accordingly contact 51 opens the holding circuit for magnet 38, which permits the operated one of the horizontal selecting bars 18—18' to be raised by its associated spring 22—22'. This unlocks the tuning shaft so that it may be rotated by the motor.

Having described my invention what I believe to be new and desire to protect by Letters Patent is set forth in the appended claims.

What is claimed is:

1. In an automatic tuning arrangement for a radio set, a tuning shaft having a stop member connected thereto, a motor coupled to said shaft, means for operating said motor to rotate said shaft and said stop member, an electromagnet having an armature, a device normally disconnected from said armature, means operated at will to connect said device to said armature, circuit means for thereafter energizing said electromagnet to operate said armature and said device, a projection on said device, mechanical means operated responsive to said operated device for moving said projection into the path of said stop member, and electrical and mechanical means operated responsive to the engagement of said projection with said stop member for controlling said motor to halt the rotation of said shaft.

2. In an automatic tuning arrangement for a radio set, a tuning shaft having a stop member connected thereto, a motor coupled to said shaft, means for operating said motor to rotate said shaft and said stop member, an electromagnet having an armature, a device normally disconnected from said armature, means operated at will to connect said device to said armature, circuit means for thereafter energizing said electromagnet to operate said armature and said device, a projection on said device, mechanical means operated responsive to said operated device for moving said projection into the path of said stop member, blocking means effective during the initial rotation of said shaft to prevent said movement of said device for keeping said projection on said device out of the path of said stop member, said blocking means coupled to said tuning shaft and controlled thereby to release said device after a predetermined rotation of said shaft, and electrical and mechanical means operated responsive to the engagement of said projection with said stop member for controlling said motor to halt the rotation of said shaft.

3. In an automatic tuning arrangement for a radio set, a tuning shaft, a pair of stop members connected to said shaft, each of said members having individual thereto a device which normally occupies a non-blocking position with respect to that member, a motor coupled to said tuning shaft, means for operating said motor to start rotating said shaft and said stop members connected thereto, an electromagnet having an armature, selection means operated at will to temporarily connect any desired one of said devices to said armature, circuit means for thereafter energizing said electromagnet to operate its armature and said one selected device, a projection on said operated selected device moved into the path of its individual stop member, and electrical and mechanical means operated responsive to the engagement of said projection with said stop member for controlling said motor to halt the rotation of said shaft.

4. In an automatic tuning device for a radio set, a tuning shaft, motor means, circuit starting means for operating said motor means to rotate said shaft at a normal operating speed, a stop member connected to said shaft and rotated thereby, means including a circuit completed in response to a predetermined rotation of said shaft at said normal speed for thereafter controlling said motor means to reduce the speed of rotation of said shaft, and means including an element thereafter engaged by said stop member for controlling said circuit starting means to stop said motor means and halt the shaft in a predetermined angular position.

5. In an automatic tuning system for a radio set, a tuning shaft, motor means coupled to said shaft, circuit starting means for operating said motor to rotate said shaft, a member connected to said shaft and rotated thereby, a stop on said member, a device associated with said stop and occupying a non-blocking position with respect to said stop throughout at least one complete revolution of said member, an electromagnet, selecting means operated to prepare said device for operation by said electromagnet, circuit means for energizing said electromagnet, coupling means controlled responsive to the operation of said electromagnet for automatically moving said device, a projection on said device advanced by said moved device into blocking position with respect to said stop when said member has completed a predetermined rotation in excess of one revolution, and electrical and mechanical means operated responsive to said stop engaging said projection on said device during the ensuing revolution of said member for controlling said circuit starting means to stop said motor means and to halt said tuning shaft in a predetermined angular position.

6. In an automatic tuning arrangement for a radio set, a tuning shaft, motor means, means for operating said motor means to rotate said shaft, two members connected to said shaft and rotated thereby, a stop on each member, each of said members having an individual device which occupies a non-blocking position during at least one complete revolution of the associated member, means operated at times for automatically moving one of said devices into a blocking position with respect to its individual member when said member has completed a predetermined number of revolutions, whereby that member engages the moved device during the ensuing revolution, means responsive to further rotation of said member and the engagement of the associated stop of said member with said device for controlling said motor operating means to stop said motor means and to halt said tuning shaft in a predetermined angular position, means operated at other times for automatically moving the other of said devices into a blocking position with respect to its individual member when said member has completed a predetermined different number of revolutions, whereby the latter member engages said other device during the ensuing revolution, means responsive to further rotation of said member and the engagement of the associated stop of said member with said device for controlling said motor operating means to stop said motor means and to halt said tuning shaft in a predetermined different angular position, and means controlled by the movement of either of said devices into a blocking position with respect to its individual stop for changing the speed of said motor means for reducing the speed at which said shaft is rotated by said motor.

7. In an automatic tuning system for a radio set, a tuning shaft, a motor, means for causing said motor to start rotating said shaft, a stop member connected to said shaft and rotated thereby, a blocking device adapted to cooperate with said stop member, means urging said blocking device into the path of said stop member, a cam effective during the initial rotation of said tuning shaft to maintain said device out of the path of said stop member against the force of said last means, said cam connected to said tuning shaft and moved in accordance with the rotation thereof to permit said blocking device to move into the path of said stop member after a predetermined rotation of said shaft, and means operated to reduce the speed of said shaft automatically when said blocking device is moved into the path of said stop, said stop member thereafter being effective to engage said device to halt the rotation of said shaft.

8. In an automatic tuning arrangement for a radio set, a tuning shaft, a pair of stop members connected to said shaft, each of said members having individual thereto a device which normally occupies a non-blocking position with respect to that member, a motor coupled to said tuning shaft, means for operating said motor to start rotating said shaft and hence moving the stop members connected thereto, an electromagnet individual to each of said devices, means for selectively operating one of said electromagnets to urge the corresponding individual device into the path of its individual stop member, and an auxiliary shaft coupled to said tuning shaft and having a pair of cams connected thereto, said cams corresponding respectively to said devices, the particular cam corresponding to said selected device effective during the initial rotation of the tuning shaft to maintain said selected device out of the path of its individual stop member against the urging force of said operated electromagnet, said particular cam being moved in accordance with the rotation of said tuning shaft to permit the selected device to move into the path of its individual stop member after a predetermined rotation of said shaft, whereby said stop member thereafter engages the selected device to halt the rotation of said shaft.

9. In an automatic tuning arrangement for a radio set, a tuning shaft, a pair of stop members connected to said shaft, each of said members having individual thereto a device which normally occupies a non-blocking position with respect to that member, a motor coupled to said uning shaft, means for operating said motor to tart rotating said shaft and hence moving the top members connected thereto, an electromagiet having an armature, selection means oper-.ted at will to temporarily connect any selected ine of said devices to said armature, means for nergizing said electromagnet to operate its rmature and said selected device, a projection in said device moved into the path of its indiidual stop member by said operated device, and in auxiliary shaft coupled to said tuning shaft ind having a pair of cams connected thereto, aid cams corresponding respectively to said de-rices, the particular cam corresponding to said operated selected device effective during the nitial rotation of the tuning shaft to maintain said projection of said operated selected device out of the path of its individual stop member against the force of said operated electromagnet, said particular cam being moved in accordance with the rotation of said tuning shaft to permit said projection of said operated selected device to move into the path of its individual stop member after a predetermined rotation of said shaft, whereby said stop member thereafter engages said projection of said operated selected device to halt the rotation of said shaft.

10. In an automatic tuning arrangement for a radio set, a tuning shaft, a pair of stop members connected to said shaft, each of said members having individual thereto a device which normally occupies a non-blocking position with respect to that member, a motor coupled to said tuning shaft, means for operating said motor to start rotating said shaft and hence moving the stop members connected thereto, a pair of electromagnets corresponding respectively to said devices, a projection on each of said devices, means for energizing either of said electromagnets at will thereby to select its corresponding one of said devices, means for operating said selected device to move said associated projection into the path of said stop member individual to said operated device, and an auxiliary shaft coupled to said tuning shaft and having a pair of cams connected thereto, said cams corresponding respectively to said devices, the particular cam corresponding to said operated selected device effective during the initial rotation of the tuning shaft to maintain said projection of said operated selected device out of the path of its individual stop member against the force of said last means, said particular cam being moved in accordance with the rotation of said tuning shaft to permit said projection of said operated selected device to move into the path of its individual stop member after a predetermined rotation of said shaft, whereby said stop member thereafter engages said projection of said operated selected device to halt the rotation of said shaft.

11. In an automatic tuning arrangement for a radio set, a tuning shaft, a pair of stop members connected to said shaft, each of said members having an individual device which normally occupies a non-blocking position with respect to that member, a motor, means for causing said motor to start rotating said shaft and hence moving the stop members connected thereto, means for selecting either of said devices and urging the selected device into the path of its individual stop member, a pair of cams connected to said tuning shaft, said cams corresponding respectively to said devices, the particular cam corresponding to said selected device effective during the initial rotation of the tuning shaft to maintain said selected device out of the path of its individual stop member against the force of said urging means, said particular cam being moved in accordance with the rotation of said tuning shaft to permit the selected device to move into the path of its individual stop member after a predetermined rotation of said shaft, whereby said stop member thereafter engages the selected device to halt the rotation of said shaft, means operated to reduce the speed of said shaft whenever a selected device is moved into the path of its individual stop member, said stop member thereafter effective to engage the selected device to halt the rotation of said shaft.

12. In an automatic tuning arrangement for a radio set, a tuning shaft, a pair of stop members connected to said shaft, each of said members having individual thereto a device which normally occupies a non-blocking position with respect to that member, a motor coupled to said tuning shaft, means for operating said motor to start rotating said shaft and hence moving the stop members connected thereto, a pair of electromagnets corresponding respectively to said devices, a projection on each of said devices, means for energizing either of said electromagnets at will thereby to select its corresponding one of said devices, an electromagnet common to all of said devices, means for energizing said common electromagnet, means controlled conjointly by said common electromagnet and the energized one of said first electromagnets for operating said selected device to move said associated projection into the path of said stop member individual to said operated device, and an auxiliary shaft coupled to said tuning shaft and having a pair of cams connected thereto, said cams corresponding respectively to said devices, the particular cam corresponding to said operated selected device effective during the initial rotation of the tuning shaft to maintain said projection of said operated selected device out of the path of its individual stop member against the force of said last means, said particular cam being moved in accordance with the rotation of said tuning shaft to permit said projection of said operated selected device to move into the path of its individual stop member after a predetermined rotation of said shaft, whereby said stop member thereafter engages said projection of said operated selected device to halt the rotation of said shaft.

EDWARD S. PETERSON.

REFERENCES CITED

The following references are of record in the file of this patent:

UNITED STATES PATENTS

| Number | Name | Date |
|---|---|---|
| 1,956,416 | Garrett | Apr. 24, 1934 |
| 2,114,416 | Plensler | Apr. 12, 1938 |
| 2,334,724 | Paessler | Nov. 23, 1943 |
| 2,378,941 | May | June 26, 1945 |
| 2,391,470 | May | Dec. 25, 1945 |